*Culbertson & Scott,*
*Brick Machine.*

Nº 7,453.   2 Sheets, Sheet 1.   Patented June 25, 1850.

AM. PHOTO-LITHO. CO. N.Y. (OSBORNE'S PROCESS)

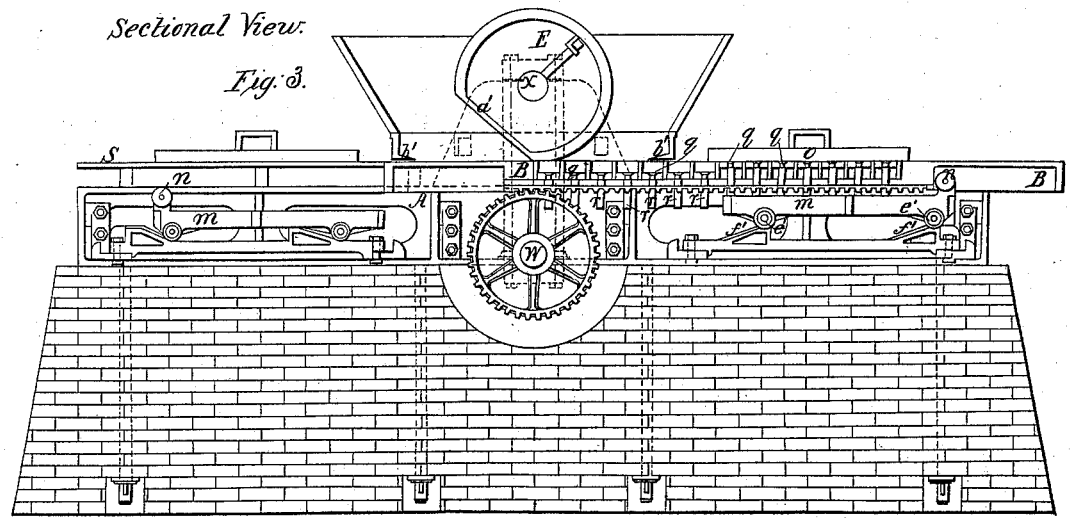

UNITED STATES PATENT OFFICE.

THOMAS CULBERTSON AND GEO. SCOTT, OF PHILADELPHIA, PENNSYLVANIA.

BRICK-PRESS.

Specification of Letters Patent No. 7,453, dated June 25, 1850.

*To all whom it may concern:*

Be it known that we, THOMAS CULBERTSON and GEORGE SCOTT, of the city and county of Philadelphia and State of Pennsylvania, have invented certain new and useful Improvements in Machinery for Molding and Pressing Bricks, and that the following is a full, clear, and exact description of the principle or character which distinguishes our invention from all other things before known and of the manner of making, constructing, and using the same, reference being had to the accompanying drawings, making part of this specification, in which—

Figure 2:
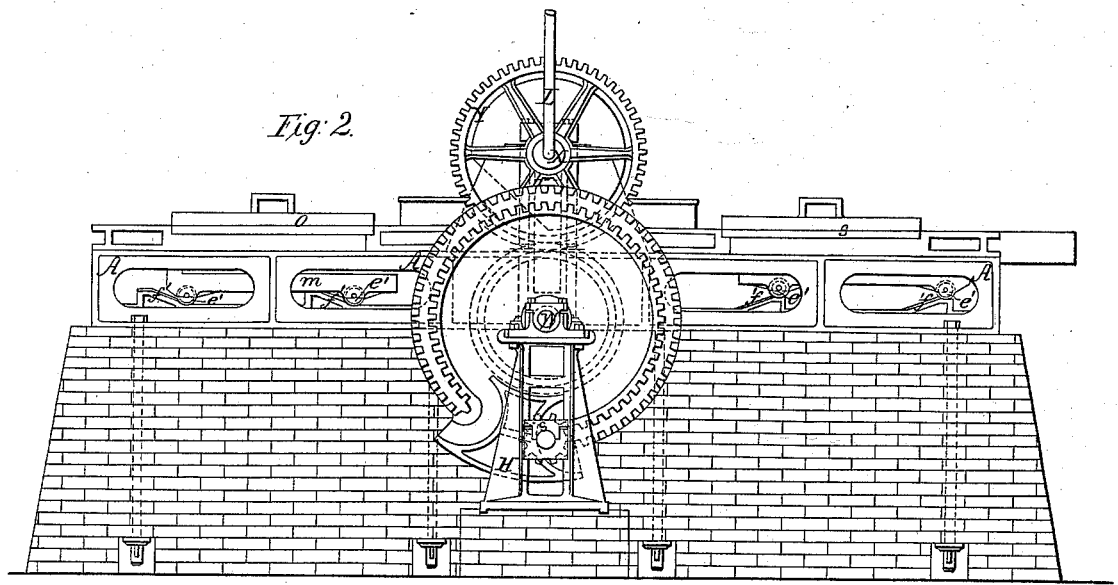
Figure 1:
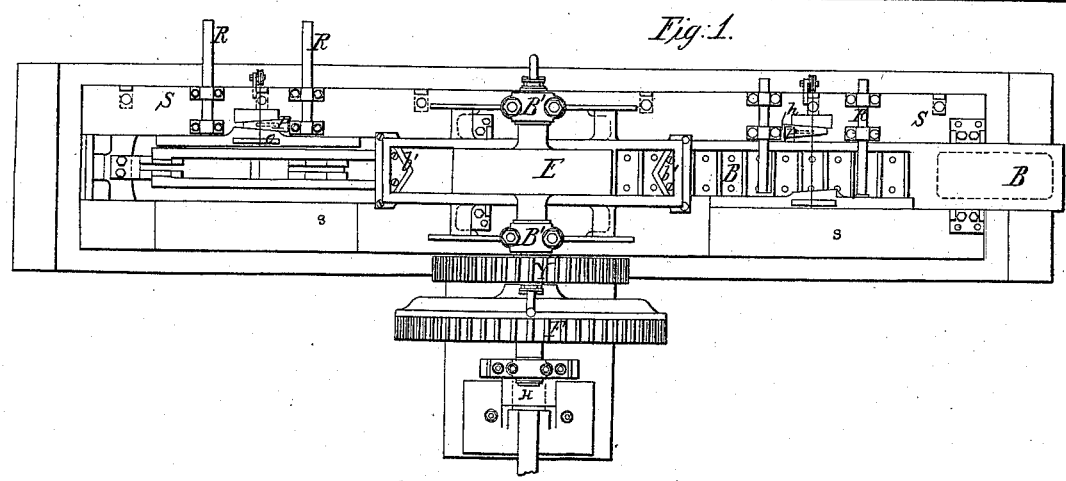

Figure 1 is a side elevation; Fig. 2, a longitudinal vertical section; Fig. 3, a plan; Fig. 4, a cross vertical section; Fig. 5 a section of the pressing wheel or cylinder on an enlarged scale.

Our herein described invention consists of improvements on a machine invented and patented by Thomas Culbertson and bearing date the sixteenth day of May A. D. 1846, but the first part of our invention is applicable to other machines for molding and pressing bricks and other articles made of clay.

The molding and pressing of bricks by machinery whether from tempered or untempered clay has heretofore been attended with serious difficulty from the tendency of the clay to adhere to the pressing surfaces and the sides of the molds. To avoid this tendency in part these surfaces have been sanded and otherwise treated to avoid the adhesion. We have discovered and by repeated trials established that the heating of these surfaces effectually avoids the adhesion of the clay to the pressing surfaces as well as the sides of the mold, and the first part of our invention consists in the application of artificial heat to the pressing and molding surfaces in the molding and pressing of bricks and other articles made of clay or of earthy compounds of which clay is the chief ingredient made by molding and pressing.

The second part of our invention which relates to the method of discharging the molded bricks from molds arranged in a reciprocating carriage consists of elevating the followers in the molds by combining the carriage which carries the molds with a secondary carriage or carriages with rollers running on inclined ways so arranged that as the carriage of molds approaches its running out motion on either side it shall act on the secondary carriage which by the continued motion of the main carriage is carried up inclined ways that in rising it may act on the followers of the mold to elevate them in a vertical direction only instead of having an oblique action as heretofore which tends to cant them in the mold.

In the accompanying drawings, (A) represents the frame and (B) the main carriage in which the molds are formed or arranged and which slide between ways (*s, s*) formed by the sides of the frame. To the molds are fitted followers (*q*) each with two stems (*r, r*) which pass through holes in the bottom of the molds which at the proper time are acted upon to force up the followers for the discharge of the bricks from the molds. The carriage of molds runs on the periphery of two rollers (*a, a*) on the main driving shaft (*w*) which rollers are placed immediately under the place where the pressure is applied. And between these two rollers there is a cog wheel (*c*) the cogs of which engage the cogs of a rack formed in the under part of the carriage and between the stems of the followers of the molds so that by the reciprocating rotary motion of the shaft (*w*) the carriage of molds receives a reciprocating motion. Care should be taken to have the periphery of the rollers (*a, a*) on which the carriage rests of the diameter of the pitch line of the cog wheel (*c*) to avoid slipping and the friction and wear which would be thereby produced. The required motion is given to the main shaft (*w*) for the reciprocating motion of the carriage by a mangle wheel (F) operated in the usual manner of the mangle wheel motion by a pinion (G) and guide roller (I) on the end of the rotating and vibrating shaft (J) which receives motion from any first mover. In a vertical line above the main shaft is another shaft (X) which carries a cylinder (E) the periphery of which runs on the upper surface of the carriage of molds for the purpose of forcing the clay into the molds. A portion of the periphery of the cylinder is cut away as at (*a'*). The shaft (X) has a cog wheel (Y) which receives motion from another cog wheel (Z) on the main shaft for the purpose of giving the required reciprocating rotary motion to the cylinder that its periphery may move with the carriage of molds; the proportions of the two cog wheels and the cylinder should be such as to insure an equal movement.

The cylinder is surrounded by a cast iron clay box or hopper (C') which receives the clay to feed the molds, the clay being previously pulverized or otherwise prepared. The clay from the hopper enters the molds and as the carriage runs under the cylinder it is forced and compressed into the molds by the periphery of the cylinder, and as the molds move on toward either end of the machine the bricks pass under a sharp edge (b') at the ends of the hopper which strikes off the surplus clay should there be any and so soon as the molds have passed from under the hopper the end of the rack of the carriage strikes against a roller (n) at one end of a secondary carriage or movable platform (m) mounted on rollers (e' e') which turn on inclined ways (f' f') and as the rollers are carried up these inclined ways the upper surface of the carriage or platform comes in contact with the stems of the followers of the molds and forces them up to discharge the bricks from the molds. The roller (n) against which the end of the rack strikes, allows the platform to rise with but little friction. There is a like arrangement at each end and two sets of molds in the carriage that a set of bricks may be molded as the carriage moves in either direction.

At the end of either movement of the carriage a pin represented by red lines (h') strikes against a pin that projects down from the under face of a wedge (p) which pin slides in a slot in the frame of the machine and this wedge against a bar (O) to push the discharged bricks from the surface of the followers and as soon as this bar is started the attendant draws the bar by hand to remove the bricks. The bar is carried back when liberated by the attendant by weight attached to a cord passing over a pulley as shown in the drawing, and the weight should be sufficient to force back the wedge so soon as it is relieved by the back motion of the carriage. A like arrangement is employed at each end. The pressing cylinder (E) is made hollow as also its shaft and to one end of the shaft is coupled by a turning coupling joint a steam pipe (L) leading from a steam boiler or generator, and to the other end is coupled in like manner an exhaust pipe. By this means a current of steam is passed through the cylinder to keep it in a heated state which artificial heat of the surface will prevent the clay from adhering to the surface of the cylinder. There is a partition (i') in the bore of the shaft to prevent the steam from passing directly through the shaft to the exhaust pipe, and therefore compel it to pass through the hollow cylinder and the shaft on that side of it toward the exhaust part is provided with a pipe which extends toward, and near to the inner periphery of the cylinder so that the steam can only escape through this pipe. And this pipe is also used to pump out of the cylinder the water that may accumulate therein by the condensation of the steam.

This method of preventing the adhesion of the clay to the surface is equally applicable to the platen of a reciprocating press as also to the bottom or follower, the sides of the molds, the clay box and the knife or sharp edge by making these parts hollow and providing them with pipes for the admission of steam. A hollow, heated rubber or roller may be applied for the purpose of smoothing the upper surface of the bricks after they have passed under the cutting edge of the knife, and it will be obvious from the foregoing that any other method of applying artificial heat may be substituted for steam, such as passing heated air through the hollow parts, but we have described the mode which we have essayed with success and which we deem the best.

What we claim as our invention and desire to secure by Letters Patent is—

1. The method of preventing clay from adhering to the surfaces which make pressure on it or in which it is pressed or molded by the application of artificial heat to such surfaces substantially as herein described.

2. And we also claim the method of elevating the followers of the molds for discharging the bricks by combining with the carriage of molds a platform or carriage which slides on inclined ways and which receives motion from a carriage of molds substantially in the manner and for the purpose specified.

THOMAS CULBERTSON.
GEORGE SCOTT.

Witnesses present:
CHAUNCEY BULKLEY,
MOSES HAGER.